United States Patent [19]

Coone

[11] 4,225,264

[45] Sep. 30, 1980

[54] METHOD AND APPARATUS FOR COUPLING ENGAGEMENT OF MISALIGNABLE FLANGES

[75] Inventor: Malcolm G. Coone, Houston, Tex.

[73] Assignee: Lynos, Inc., Houston, Tex.

[21] Appl. No.: 943,597

[22] Filed: Sep. 18, 1978

[51] Int. Cl.³ .......................... F16D 1/00; F16L 23/00
[52] U.S. Cl. .............................. 403/337; 403/DIG. 8;
   285/261; 285/363; 285/178; 285/405
[58] Field of Search ................... 403/335, 337, 338;
   285/178, 363, 405, 412, DIG. 19, 261

[56] References Cited

U.S. PATENT DOCUMENTS

| 335,101 | 2/1886 | Adams | 285/263 |
|---|---|---|---|
| 1,944,219 | 1/1934 | Chilton | 285/405 |
| 2,082,173 | 6/1937 | Miller | 285/178 X |
| 2,968,501 | 1/1961 | Tisch | 285/DIG. 19 UX |
| 3,006,443 | 10/1961 | Siler | 285/178 UX |

FOREIGN PATENT DOCUMENTS 914109  12/1962  United Kingdom ............ 403/DIG. 8

Primary Examiner—Wayne L. Shedd
Attorney, Agent, or Firm—William C. Norvell, Jr.

[57] ABSTRACT

Apparatus and method are provided for coupling engagement of misalignable flanges disposed around the exterior of first and second tubular ends which may be initially rotatably or pivotally disposed with respect to one another, each of the flanges having at least one passage which is exteriorly conically tapered in a first direction therethrough. In one embodiment, the apparatus provides plug means which are exteriorly conically tapered in the first direction for companion tapered receipt within each of the conically tapered passages, the relative taper of the passage and the plug means preventing the plug means from freely passing through the respective passage. The plug means has a bore which is disposed therethrough with the center line of the bore being eccentrically defined away from the planar axis of the plug means. Means are provided which are companionly receivable through the bore of the plug means for securement with the plug means and for engaging the flanges.

8 Claims, 10 Drawing Figures

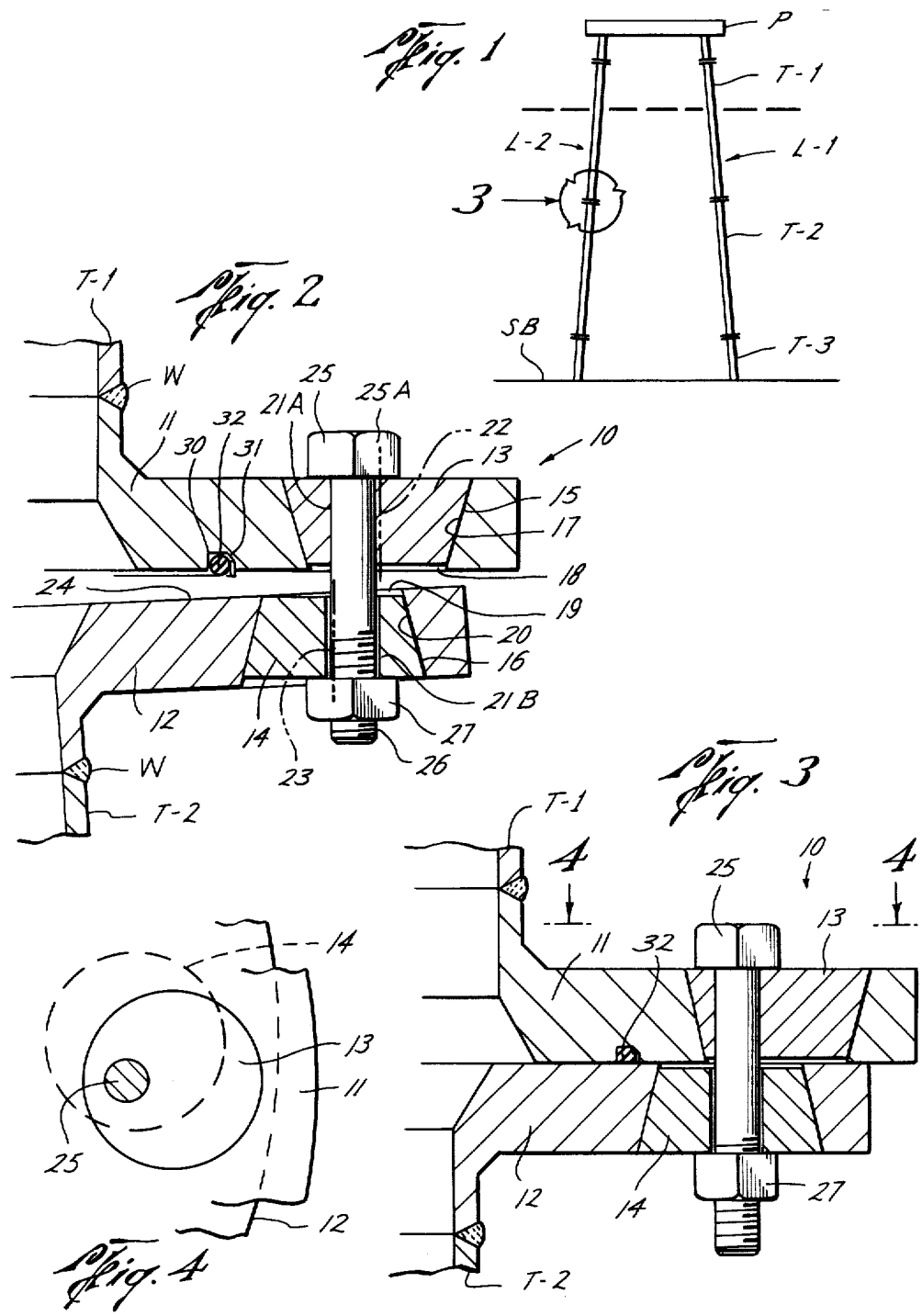

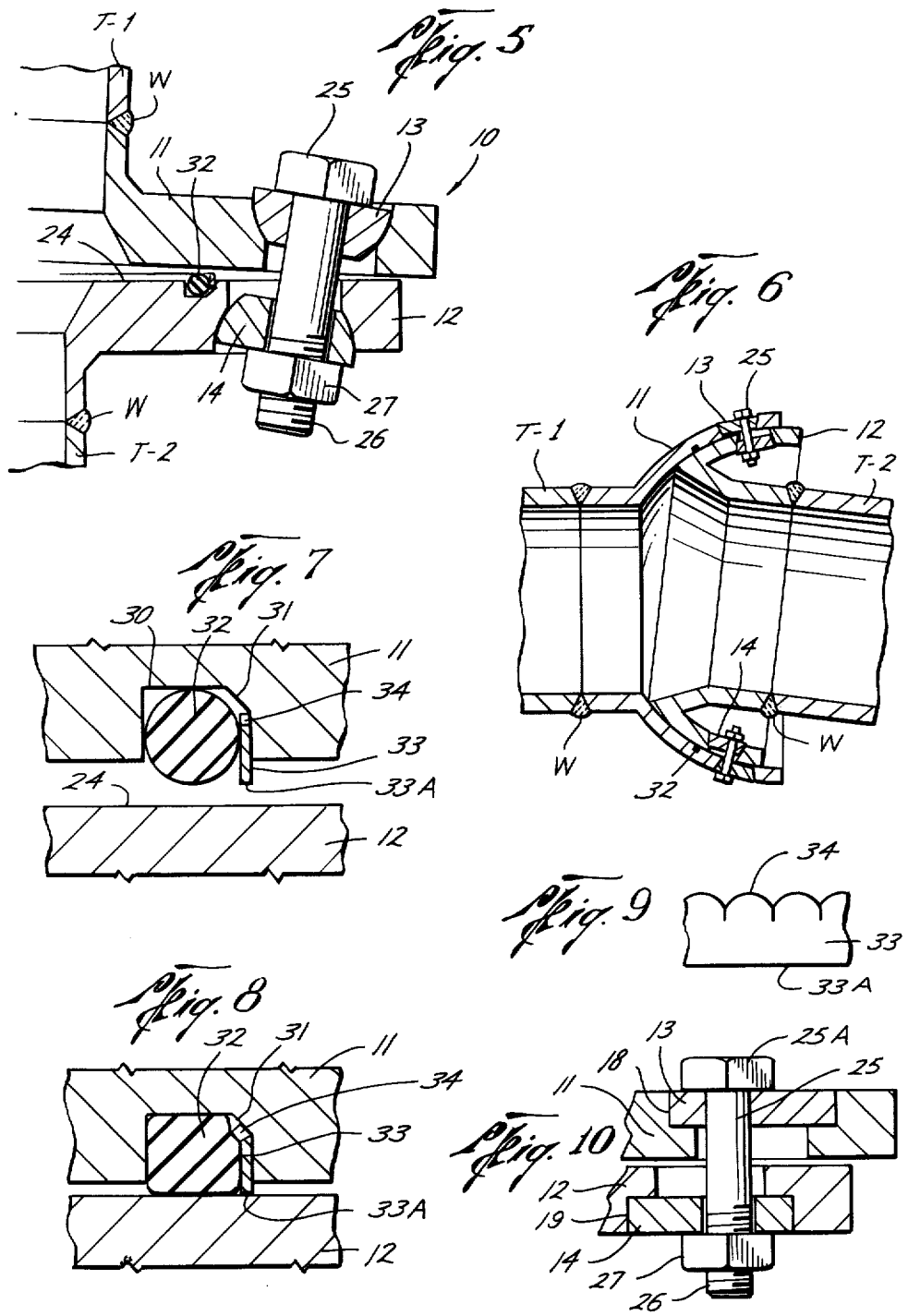

METHOD AND APPARATUS FOR COUPLING ENGAGEMENT OF MISALIGNABLE FLANGES

BACKGROUND OF THE INVENTION

1. Field of the Invention

The invention relates to an apparatus and method for engaging misalignable flanges of tubular ends, such as those found on a pipeline, or sections, such as legs, of a platform for the drilling and completion of subterranean oil and gas wells.

2. Description of the Prior Art

In the construction of a sub-sea oil or gas transmission pipeline or the engagement of tubular sections, such as leg portions, of a platform for anchoring on the ocean floor for the drilling or completion of a subterranean oil or gas well, it frequently becomes necessary to engage the ends of tubular members, one to another. Oftentimes, because of the working environment and the actual length and weight of the tubular members, it oftentimes becomes extremely difficult to align the tubular ends for subsequent engagement. For example, when tubular elements subsequently defining a leg or other portion of an offshore platform are desired to be secured together, it is oftentimes necessary for a diver to operate at a considerable depth of water in order to secure the tubular members. Because of the considerable mass and weight of the members, environmental conditions, such as water current, waves, and human error, result in the tubular ends being somewhat misaligned for co-engagement. These tubular ends normally will be provided with some type of flange members or equivalent elements having bores disposed therethrough for subsequent securement of bolt members to be affixed by the diver. However, because of the aforesaid conditions, oftentimes the diver will discover that the tubular ends have become misaligned, thus preventing convenient and quick alignment of the flange bores and the tubular ends.

The present invention remedies this situation by providing an apparatus and method which are quickly securable through the tubular ends for quick alignment, and, alternatively, sealing alignment, of the tubular ends, one to another. The present method and apparatus are particularly unique inasmuch as they are simple in construction, and may be readily applied by a diver in a single trip operation, thus reducing considerable time and cost in interengagement of the tubular ends, as well as affording considerable safety for the driver because of the reduced time expended in the actual alignment and engaging operation.

The present invention is equally applicable upon inland and/or surface operations, such as in the connection of pipelines, and the like, where, heretofore, costly equipment and time have been utilized and expended in aligning initially misaligned tubular ends.

Particular prior art coupling apparatuses include those as disclosed in U.S. Pat. No. 3,393,926, entitled "Hydraulic Coupling," James F. Arnold, inventor, the apparatus including an elongated tubular casing for fitting around a length of pipe to be joined, with an opening in the casing communicating to an exterior surface of fluid under pressure with at least one piston adjacent the opening. Resilient sealing means and gripping means are disposed axially from the piston. Upon entry of fluid under pressure through the opening, the piston is forced axially toward the sealing means and gripping means, whereupon these elements move into sealing engagement with the pipe inside the casing.

U.S. Pat. No. 3,566,505, entitled "Apparatus For Aligning Two Sections Of Pipe," Charles F. Martin, inventor, discloses an apparatus including a pair of axially spaced apart clamps, each clamp being arranged for engaging about a length of one of the sections of pipe, and including a plurality of connecting members connected between the clamps. Abutment means are interposed between the ends of the connecting means and the clamps for holding the clamps and members in predetermined relationship for axially aligning the clamps. This apparatus also includes means for moving the connecting members to relationship whereby the sections of pipe are axially aligned.

U.S. Pat. No. 3,598,429, entitled "Hydraulic Coupling," James F. Arnold, inventor, discloses a fluid pressure operated coupling element utilizing a piston and slip assembly, the apparatus being particularly utilized to connect two pipe sections together or to repair a leak in one pipe section.

U.S. Pat. No. 3,695,643, entitled "Adjustable Length Coupling," William E. White, Jr., inventor, discloses an adjustable length coupling having co-axial telescoping housings which are arranged for connection at their axially outward ends to other members. This apparatus utilizes tapered slips and radially deformable packers for actuation by hydraulic means into restraining and sealing engagement between the housings to prevent relative movement between the housings after installations.

U.S. Pat. No. 3,703,033, entitled "Connector For Tubular Members," James F. Arnold, inventor, discloses an apparatus having a housing which is arranged for positioning over the end of a tubular member, the apparatus having a tapered slip assembly which is arranged for actuation into gripping engagement with a tubular member. The apparatus also defines longitudinally aligned cylinders which are circumferentially spaced about within the housing and a piston which is slidably positioned in each of the cylinders to provide actuation force to the slip assembly in response to a hydraulic pressure.

U.S. Pat. No. 3,737,179, entitled "Submarine Connection For Misaligned Pipes," William E. White, Jr., inventor, discloses an apparatus which contains a pair of housings, each of which is arranged for slidable mounting over the adjacent pipe ends to be coupled, and are provided with a fluid actuable, annular, radially moveable resilient seal and gripping means arranged to engage the surface of the pipe.

U.S. Pat. No. 4,005,881, entitled "Ring Set Ball Coupling," James A. Burton, et al, inventors, discloses a pair of coupling members, one of which contains an annular spherically-shaped enlarged portion, with the other coupling having a housing with an internal surface for receiving the spherically-shaped forward side of the enlarged portion for mating engagement therewith.

U.S. Pat. No. 4,006,921, entitled "Pipe Coupling," Harvey O. Mohr, inventor, discloses an apparatus having an annular bowl means which is housed within one of a plurality of tubular members including a pair of axially and oppositely tapered annular surfaces, with a plurality of gripping elements which are circumferentially disposed within the annular bowl.

Other and commercially available flange connecting devices include a somewhat cumbersome apparatus incorporating a ring gear actuated by a hydraulic drive motor and drive pinion means with screw drive pinions for activation of clamp dogs, together with a torque limiting clutch for operation of the hydraulic drive motor.

Such prior art apparatuses, although presumably effective for their given operation, are obviously either comparatively expensive, cumbersome, or require considerable periods of time in which to afford connection of a flange. Indeed, some of the apparatuses are inoperable in connecting flanges which are misaligned.

SUMMARY OF THE INVENTION

A method and apparatus are provided for coupling engagement of misalignable flanges which are disposed around the exterior of tubular ends, which may be initially rotatably or pivotally disposable with respect to one another. Each of the flanges has at least one passage conically tapered in a first direction therethrough. The apparatus preferably comprises plug means which are exteriorly conically tapered in a first direction for companion tapered receipt within each of the conically tapered passages, with the relative taper of the passage and the plug means preventing the plug means from freely passing through the respective passage. The plug means has a bore which is disposed therethrough and has its center line eccentrically defined from the planar axis of the plug means. Engagement means are companionly receivable through the bore of the plug means for securing the plug means and engaging the flanges.

BRIEF DESCRIPTION OF THE DRAWINGS

FIG. 1 is a schematic illustration of a platform having tubular members which define a platform leg which are to be aligned for proper landing and anchoring of the platform on the ocean floor.

FIG. 2 is a horizontal sectional drawing illustrating tubular ends having vertically and horizontally misaligned flanges, with the apparatus of the present invention being inserted within the flanges for proper sealing alignment and engagement. The view shown may be of flanges on tubular members of the platform of FIG. 1. Alternatively, the flanges may be disposed upon the first and second tubular members of a pipeline, or the like.

FIG. 3 is a horizontal sectional view similar to that shown in FIG. 2, illustrating the apparatus and the flanges in complete sealing alignment, yet horizontally misaligned.

FIG. 4 is a downwardly facing view taken along line 4—4 of FIG. 3 illustrating the eccentric mounting of the engaging means companionly receivable through the bore of the plug means, as well as the laterally eccentric relationship between the plug means.

FIG. 5 is a view similar to that shown in FIG. 3, illustrating an alternative embodiment of the present invention.

FIG. 6 is an illustration of yet another alternative embodiment of the present invention showing the apparatus utilized for sealing alignment of first and second tubular ends with domeshaped flanged ends thereon, one of said ends being receivable within the other of said ends.

FIG. 7 is an enlarged view of the seal assembly used in conjunction with the coupling apparatus of the present invention, the seal assembly being shown as an enlarged view of the assembly in the position as illustrated in FIG. 2.

FIG. 8 is a view similar to that illustrated in FIG. 7, showing the seal assembly in sealing relationship with each of the flanges, as shown in FIG. 3.

FIG. 9 is a partial sectional view illustrating the semicircular design of the upper end of the support element of the seal ring apparatus.

FIG. 10 is an illustration of another alternative embodiment of the invention illustrating, in cross-section, an engroovement within each of the flanges, with companion plug and securing means disposed therein.

DESCRIPTION OF THE PREFERRED EMBODIMENTS

Referring first to FIG. 1, a platform P is disposed securely above a quadrant of legs, the legs L1 and L2 of which are illustrated in FIG. 1, each of said legs comprising upper tubular member T-1 and lower tubular member T-2 engaged one to another, together with end tubular member T-3 being affixed to the lowermost end of lower tubular member T-2 and resting upon the sea bed SB therebelow.

Now referring to FIG. 2, the apparatus 10 consists of an upper circumferentially extending flange 11 which is secured to the lowermost end of upper tubular member T-1 by means of affixation of weld W therearound. Companionly, a lower flange 12 is circumferentially and exteriorly disposed around the uppermost end of the lower tubular member T-2 and secured thereto by means of weld W.

The upper flange 11 has a series of spaced apart plugs 13 which are disposed within a passage 18 having an inwardly tapered wall defining a passage 17 therearound. Each of the plugs 13 has a companion exterior taper 15 which engagingly compliments the taper 17 of the passage 18 of the plug 13, such that the plug 13 is permitted to enter into the passage 18, but is prevented from passing therethrough because of the interface of the tapers 17 and 15.

The plug 13 has a longitudinally disposed bore 21A therethrough for selective receipt of companion longitudinally extending securing means 25 having a head 25A enlarged over the diameter of the bore 21A. When engaged through each of the flanges 11 and 12, the securing means 25 is affixed therethrough by means of nut member 27 secured thereto by threads 26.

The upper flange 11 also defines interior of the tapered passage 17 a housing 30 for receipt of a circumferentially extending elastomeric seal element 32 disposed therein.

Now referring to FIG. 7, the housing 30 has a beveled shoulder at the uppermost and exteriorly facing portion of the housing 30, away from the tubular member T-1. Prior to sealing engagement of the seal 32 between the upper flange 11 and the lower flange 12, a support 33 is disposed around the exterior of the seal 32 away from the tubular ends T-1 and T-2 for securement along the shoulder 31. The support 33 is defined at its uppermost end by a plurality of arches 34 for permitting the support 33, which is generally metallic in nature, to flex to companion interface with the shoulder 31 as the upper and lower flanges 11 and 12 are sealingly urged together by affixation of the securing means 25 through the plugs 13 and 14. The support 33 contains at its lowermost end a lower section 33A which may protrude out of the housing 30, just slightly, as the flanges 11 and 12 are sealingly engaged together to provide seal integrity of the seal 32 by somewhat lowerly defining and extending the housing 30 therefor.

A companion plug 14, similar in construction as the plug 13, is provided for disposal within a tapered passage 20 within a lower flange 12, the plug 14 having a taper 16 for companion interface with the tapered passage 20 of the lower flange 12, such that the second or lower plug 14 is permitted to enter into the passage 20 of the flange 12, but is prevented from passing completely therethrough. The plug 14 defines a bore 21B therethrough for passage of the securing means 25.

It should be noted that the taper 20 is defined around the lower passage 19, while the taper 15 of the upper plug 13 is defined around the passage 18.

It will be appreciated that the bore 21A of the plug 13 is eccentrically disposed away from the axis center line 22 of the plug 13. Correspondingly, the bore 21B of the lower plug 14 also is eccentrically disposed away from the axis center line 23 of the plug 14. It is this eccentric disposal of the bores 21A and 21B, together with the tapered configuration of the plugs 13 and 14, which permits each of the plugs 13 and 14 to be rotated within their respective passages 18 and 19 for alignment of the bores 21A and 21B for longitudinal insertion therethrough of the securing means 25, whereby the upper and lower flanges 11 and 12 may be secured one to another, quite readily, by a diver, or other personnel.

When it is desired to incorporate the apparatus of the present invention for the coupling engagement of first and second tubular members, it is, of course, necessary to taper the flanges of the tubular members to compliment the taper of the plug elements to be inserted therethrough.

When it is discovered that the tubular ends T-1 and T-2 are not properly aligned for normal securement therethrough of prior art securing means, such as when the tubular members T-1 and T-2 are defined as portions of a leg L1 of an offshore platform structure, a diver will locate each of the upper and lower flanges 11 and 12 and will dispose through one of the passages 19 in the lower flange 12 the plug 14. Thereafter, he will insert the plug 13 within the passage 18 of the upper flange 11 and will rotate the plug 13 therein until such time as the securing means 25 is permitted to become properly longitudinally aligned with the bore 21B of the lower plug 14 to enable the securing means 25 to completely pass therethrough. Thereafter, the procedure described above is repeated for each of the passages on and around each of the flanges 11 and 12. Subsequently, the nuts 57 may be secured upwardly of the threads 26 for sealing coupling engagement of the flanges 11 and 12, to the position shown in FIG. 3.

While the flanges 11 and 12 are being secured one to another by rotation of the nut 57 about the threads 26, the seal means as shown in FIG. 7 is deformed by the seal surface 24 on the lower flange 12 coming upon and against the seal 32, as well as upon the lower section 33A of the support 33 to shift the support 33 within the housing 30 such that the arch 34 on the support 33 flexes to companionly shoulder against the beveled shoulder 31 defined on the housing 30. Now, as shown in FIG. 8, the seal is properly deformed within the housing 30 and the lower end 33A of the support 33 extends somewhat outwardly of the housing 30 to provide a housing extension to maintain the integrity of the deformed seal 32 within the housing 30 to provide proper sealing securement between the upper flange 11 and the lower flange 12.

It will be appreciated that the steps described above in implementing the coupling sealing engagement of the upper and lower flanges 11 and 12 of the tubular members T-1 and T-2 may be varied somewhat. For example, the upper plug 13 may be first placed within the passage 18, and thereafter the plug 14 inserted within the passage 19, with rotation of the plug 14 being implemented just prior thereto for passage through the bore 21B of the securing means 25. Additionally, the given set of plugs 13 and 14 may be sealingly secured into a companion given set of passages 18 and 19 prior to incremental initiation around each of the flanges 11 and 12 of the securing method of the present invention utilizing the apparatus of the present invention, until such time as each of the passages 18 and 19 around the circumferential exterior of the flanges 11 and 12 have disposed therethrough complimentary plugs 13 and 14 and securing means 25 upon nut 27.

As an alternative embodiment, particularized in FIG. 5, the passage 18 may be tapered in at least a semi-circular configuration. Correspondingly, when this alternative embodiment is utilized, the plug 13 will have its taper 15 companionly defined. Still, the plug 13 will be permittered to enter into the passage 18, but because of the relative tapers 15 and 17, the plug 13 will not be permitted to pass completely through the passage 18. Of course, the lower plug 14 and passage 19 will have correspondingly defined tapers. In this alternative embodiment, the method of securing the flanges 11 and 12 one to another will be as described above.

In still another alternative embodiment, illustrated in FIG. 6, tubular member T-1 is shown as having affixed at one end thereof by weld W a bell-like or semi-circular dome flange 11. Tubular member T-2 is shown having affixed by weld W a companion semi-circular or dome-like flange 12 having an internal diameter somewhat smaller than that of the dome-like flange 11 for securement therein. The parts of the apparatus 10 are as illustrated in FIGS. 2, 3 and 5, and the operation for coupling sealing alignment of the flanges 11 and 12 of the tubular ends T-1 and T-2 is as illustrated above.

Referring now to FIG. 10, illustrating another alternative embodiment of the present invention, upper and lower flanges 11 and 12 are shown as horizontally misaligned. The flanges 11 and 12 have defined thereon engroovements 18 and 19, respectively. The engroovement 18 within the flange 11 receives complimentary plug means 13, while the engroovement 19 upon lower flange member 12 receives its companion plug means 14. A bolt 25 having a head member 25A may be initially carried by the plug means 13, or, alternatively, may simply be a separate piece which is selectively inserted within a bore through the plug means 13. Assuming that the bolt 25 initially is carried together with the engroovement 13, the bolt 25 and the engroovement 13 are disposed within the groove 18 such that the bolt 25 portion which is protruding exteriorly and lowerly of the plug means 13 is permitted to pass through the groove 18, but, because of the relationship between the head 25A and the plug means 13, the bolt 25 is not permitted to completely pass through the engroovement 18. The bolt 25 passes through a companion bore defined within the lower plug means for the lower flange 12 and a nut 27 is threadedly secured to the bolt 25. Now, even though the upper and lower flanges 11 and 12 still are horizontally misaligned, they have been properly secured one to another.

In FIG. 10, it should be noted that each of the plug means 13 and 14 rest within their respective flanges 11 and 12, but are prevented from passing therethrough because of the relative configuration thereof in relation to the respective engroovements 18 and 19.

It will be appreciated that the apparatus of the present invention may also be utilized to engage flanges which are not necessarily misaligned and which may be believed to possibly be misaligned but, in fact, are discovered by a diver or other personnel to be substantially aligned. Thus, the apparatus can be used when there is any doubt about the flange alignment factor and may be conveniently utilized on either aligned or misaligned flanges.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. Apparatus for coupling engagement of misalignable flanges disposed around the exterior of tubular ends, each of said flanges having at least one passage therethrough and a taper defining said passage for locating plug means on said taper and for preventing complete passage of said plug means through said passages, said apparatus comprising: plug means for companion receipt within each of said tapers, the relative configuration between each of the tapers and each of the said plug means preventing said plug means from freely passing through the said respective passage, said plug means having a bore disposed therethrough, the center line of said bore being eccentrically defined away from the planar axis of said plug means; means companionly and selectively receivable through the bore of said plug means for securement with said plug means and for engaging said flanges; and elastomeric seal means for preventing fluid communication across and between the flanges of said tubular ends, said seal means being housed within one of said flanges and having an encircling band member for prevention of extrusion of said ring within said housing.

2. Apparatus for coupling engagement of misalignable flanges disposed around the exterior of first and second tubular ends, the first tubular end being initially pivotally disposable within the second tubular end, each of said flanges having at least one passage therethrough and a taper defining said passage for locating plug means on said taper and for preventing complete passage of said plug means through said passage, said apparatus comprising: plug means for companion receipt within each of said tapers, the relative configuration between each of the said tapers and each of the said plug means preventing said plug means from freely passing through the said respective passage, said plug means having a bore disposed therethrough, the center line of said bore being eccentrically defined away from the planar axis of said plug means; means companionly and selectively receivable through the bore of said means for securement with said plug means and for engaging said flanges and said first and second tubular ends, whereby thereafter the first tubular end is prevented from pivoting within the said second tubular end; and elastomeric seal means for preventing fluid communication across and between the flanges of said tubular ends, said seal means being housed within one of said flanges and having an encircling band member for prevention of extrusion of said ring within said housing.

3. Apparatus for coupling engagement of misalignable flanges disposed around the exterior of tubular ends, each of said flanges having a plurality of passages therethrough and a taper defining said passage for locating plug means on said taper and for preventing complete passage of said plug means through said passage, said apparatus comprising: plug means for companion receipt within each of said tapers, the relative configuration between each of the said tapers and each of the said plug means preventing said plug means from freely passing through the said respective passage, said plug means having a bore therethrough, the center line of said bore being eccentrically defined away from the planar axis of said plug means; means companionly and selectively receivable through the bore of said plug means for securement with said plug means and for engaging said flanges; and elastomeric seal means for preventing fluid communication across and between the flanges of said tubular ends, said seal means being housed within one of said flanges and having an encircling band member for prevention of extrusion of said ring within said housing.

4. Apparatus for coupling engagement of misalignable ends of tubular members, comprising: a flange disposed around at least one end of each of said tubular members, each of said flanges having a plurality of passages therethrough and a taper defining said passages for locating plug means on said tapers and for preventing complete passage of said plug means through said passages; plug means for companion receipt within each of said tapers, the relative configuration between each of the said passages and each of the said plug means preventing said plug means from freely passing through the said respective passage, said plug means having a bore therethrough, the center line of said bore being eccentrically defined away from the planar axis of said plug means; means companionly and selectively receivable through the bore of said plug means for securement with said plug means and for engaging said flanges; and elastomeric seal means for preventing fluid communicating across and between the flanges of said tubular members, said seal means being housed within one of said flanges and having an encircling band member for prevention of extrusion of said ring within said housing.

5. Apparatus for coupling engagement of misalignable ends of first and second tubular members, comprising: a flange disposed around at least one end of each of said first and second tubular members, each of said flanges having at least one passage therethrough and a taper defined across said passage for locating plug means on said taper and for preventing complete passage of said plug means through said passage; plug means for companion receipt within each of said tapers, the relative configuration between each of said tapers and the said plug means preventing said plug means from freely passing through the said respective passage, said plug means having a bore disposed therethrough, the center line of said bore being eccentrically defined away from the planar axis of said plug means; means companionly and selectively receivable through the bore of said plug means for securement with said plug means and for engaging said flanges and said first and second tubular members; and elastomeric seal means for preventing fluid communication across and between the flanges of said tubular members, said seal means being housed within one of said flanges and having an encircling band member for prevention of extrusion of said ring within said housing.

6. Apparatus for coupling engagement of misalignable tubular ends, comprising: a flange element disposed around the exterior of said tubular ends, each of said flanges having a passage therethrough and a taper defining said passage for locating plug means on said taper and for preventing complete passage of said plug means through said passage; plug means for companion receipt within each of said tapers, the relative configuration between each of said tapers and each of the said plug means preventing said plug means from freely passing through the said respective passage, said plug means having a bore therethrough, the center line of said bore being eccentrically defined away from the planar axis of said plug means; means companionly and selectively receivable through the bore of said plug means for securement with said plug means and for engaging said flanges; and elastomeric seal means for preventing fluid communication across and between the flanges of said tubular ends, said seal means being housed within one of said flanges and having an encircling band member for prevention of extrusion of said ring within said housing.

7. Apparatus for coupling engagement of first and second tubular ends, each of said tubular ends having a plurality of passages therethrough and a taper defining said passage for locating plug means on said taper and for preventing complete passage of said plug means through said passage, said apparatus comprising: plug means for companion receipt within each of said tapers, the relative configuration between each of the said tapers and each of the said plug means preventing said plug means from freely passing through the said respective passage, said plug means having a bore therethrough, the center line of said bore being eccentrically defined away from the planar axis of said plug means; means companionly and selectively receivable through the bore of said plug means for securement with said plug means and for engaging said tubular ends; and elastomeric seal means for preventing fluid communication across and between said tubular ends, said seal means being housed within one of said tubular ends and having an encircling band member for prevention of extrusion of said ring within said housing.

8. The apparatus of claim 1, 2, 3, 4, 5, 6 or 7 wherein said encircling band has a plurality of circumferentially extending arch members flexible within a housing for said seal means in said flange or said tubular end and between said housing and said seal means.

* * * * *